Figure 2:
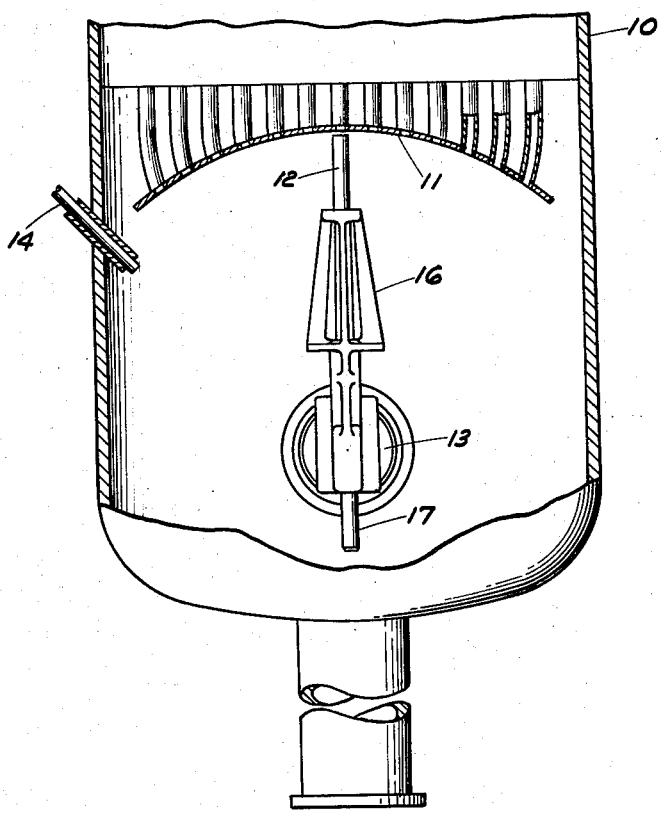

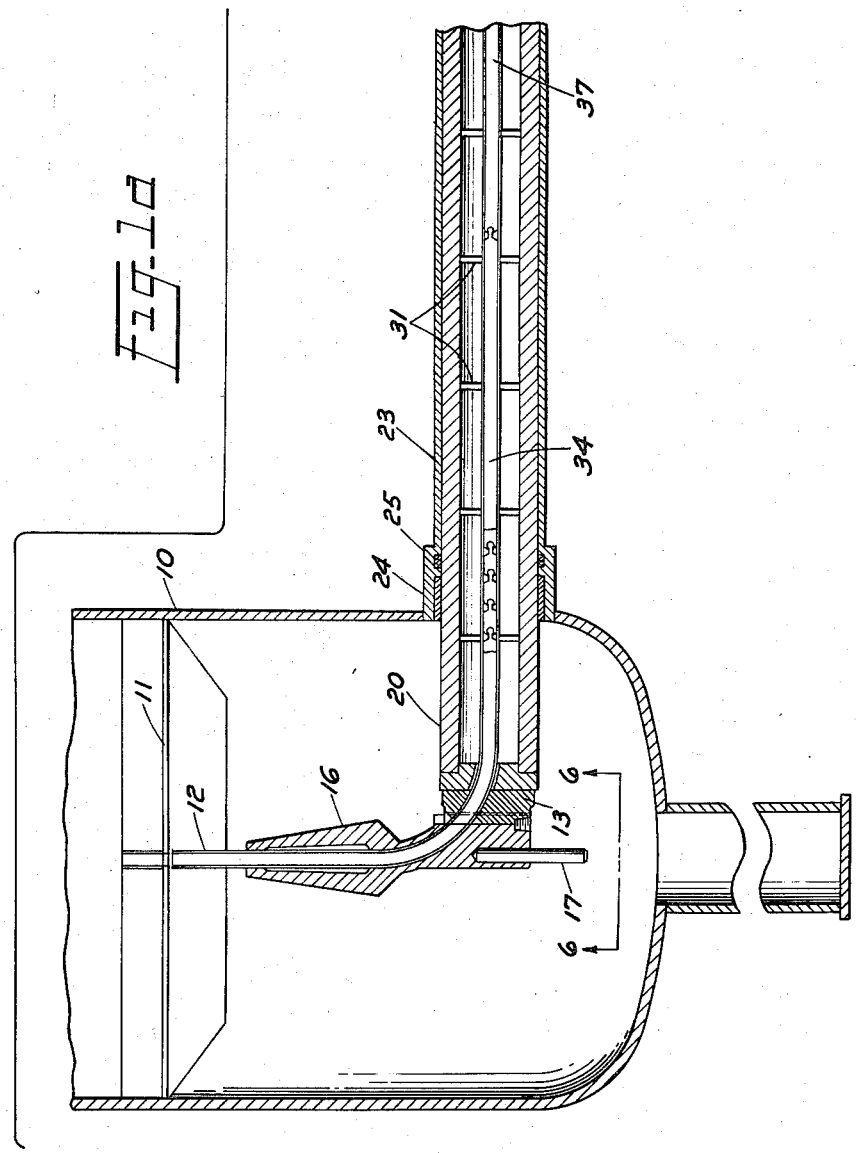

July 7, 1959
S. L. SIMON
2,893,575
LOADING MACHINE FOR REACTORS
Filed Jan. 17, 1950
4 Sheets-Sheet 2
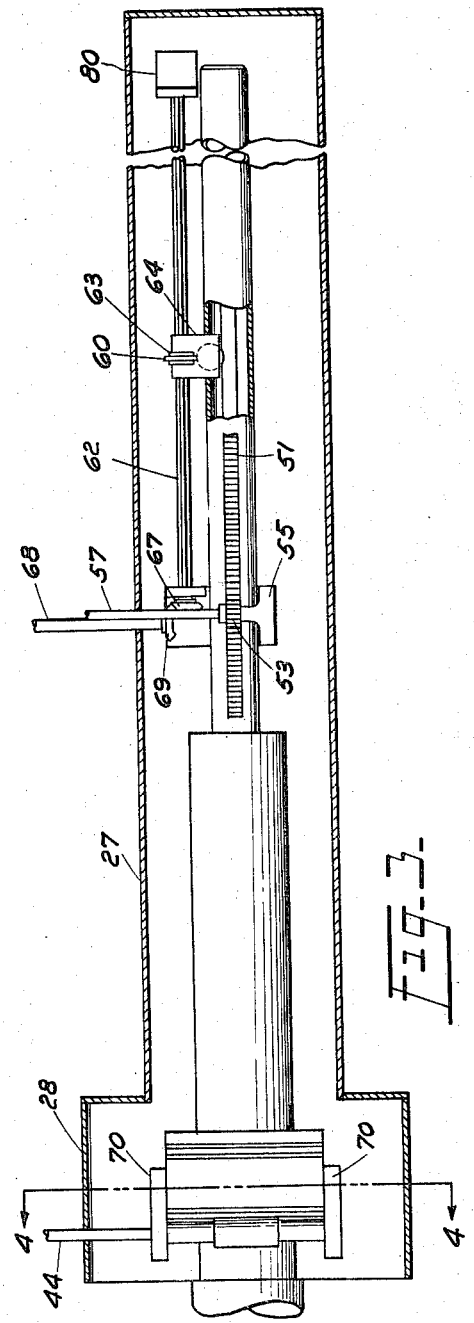
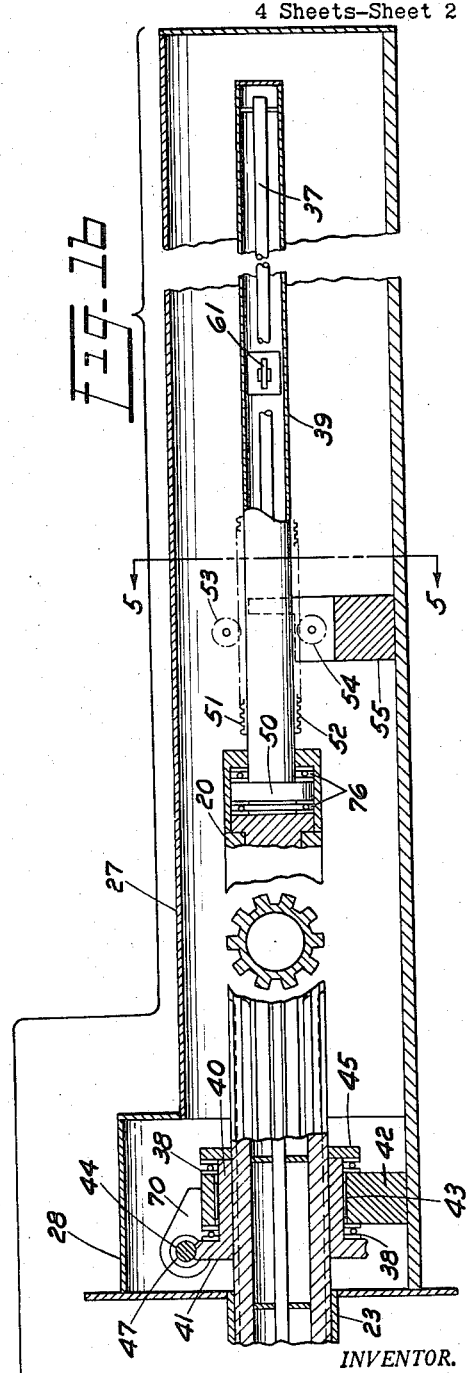
INVENTOR.
Sidney L. Simon INVENTOR.
Sidney L. Simon July 7, 1959

S. L. SIMON 2,893,575

LOADING MACHINE FOR REACTORS

Filed Jan. 17, 1950

4 Sheets-Sheet 4

INVENTOR.
Sidney L. Simon
BY
ATTORNEY

United States Patent Office 2,893,575
Patented July 7, 1959

2,893,575
LOADING MACHINE FOR REACTORS

Sidney L. Simon, Cleveland, Ohio, assignor to the United States of America as represented by the United States Atomic Energy Commission Application January 17, 1950, Serial No. 138,950

3 Claims. (Cl. 214—18)

This invention relates to an apparatus for loading or charging slugs of fissionable material into a nuclear reactor or chain reacting pile. It is common in nuclear reactors to have parallel cylindrical fuel channels and my invention is especially concerned with charging fuel into nuclear reactors having parallel vertical fuel channels therein. The invention is not limited, however, to reactors wherein the fuel channels are vertical, nor is it necessarily limited to reactors having parallel fuel channels.

The charging of fresh fuel elements into nuclear reactors is a difficult problem there being a number of considerations giving rise to the difficulties. The loading operation must of course be conducted behind or within radioactive shielding barriers for the protection of personnel. Also the entire reactor including the chamber in which the loading operation is effected is within a pressure tight shell or casing and the fresh fuel elements must be brought within this casing from exteriorally thereof. The means for introducing the fresh fuel elements or cartridges into the entrances of the fuel channels must be capable of accurate alignment with individual fuel channels to permit the transfer of fuel elements from the loading mechanism to the reactor channels. From the foregoing, it is seen that the various considerations involved place limitations on the mechanisms and techniques that are practical for loading reactors.

The apparatus of my invention is a "muzzle loading" type since it comprehends a delivery tube or muzzle having adjustment whereby the muzzle may be brought into alignment with any one of a plurality of fuel channels. The delivery end, that is, the delivery tube, is located within the pressure shell and it is also disposed within shielding barriers to shield the radioactivity while fuel cartridges or slugs are forced through the delivery tube by an externally driven flexible ram.

The primary object is to provide a fuel loading machine for a nuclear reactor wherein a manifold is provided which is in the form of a section of a cylindrical surface with a fuel cartridge delivery tube cooperating therewith, the tube having rotary movement corresponding to the arc of the cylindrical surface and having reciprocatory movement along the longitudinal axis of the cylindrical surface.

Another object of the invention is an arrangement as in the foregoing object wherein the delivery tube is formed as a right angle bend at the end of a longer tube, the longer portion being rotatable and reciprocatable within a sleeve, a flexible ram being provided within the tube portion and being reciprocatable within the tube by external drive means for forcing fuel elements through the tube and out its delivery end and into the channels of the reactor.

Figure 5:
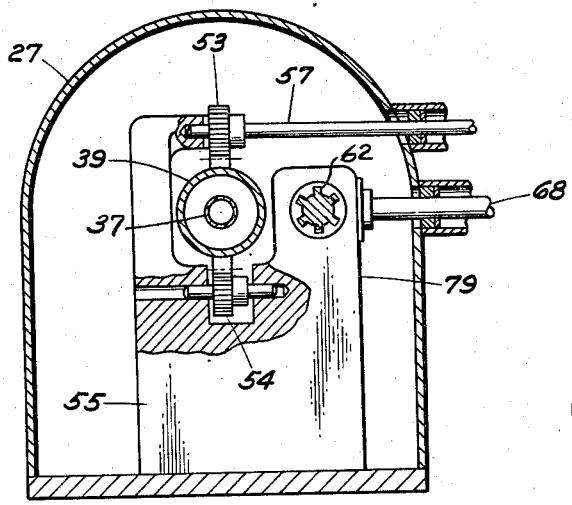
Figure 6:
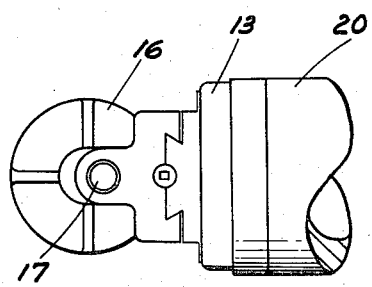
Figure 4:
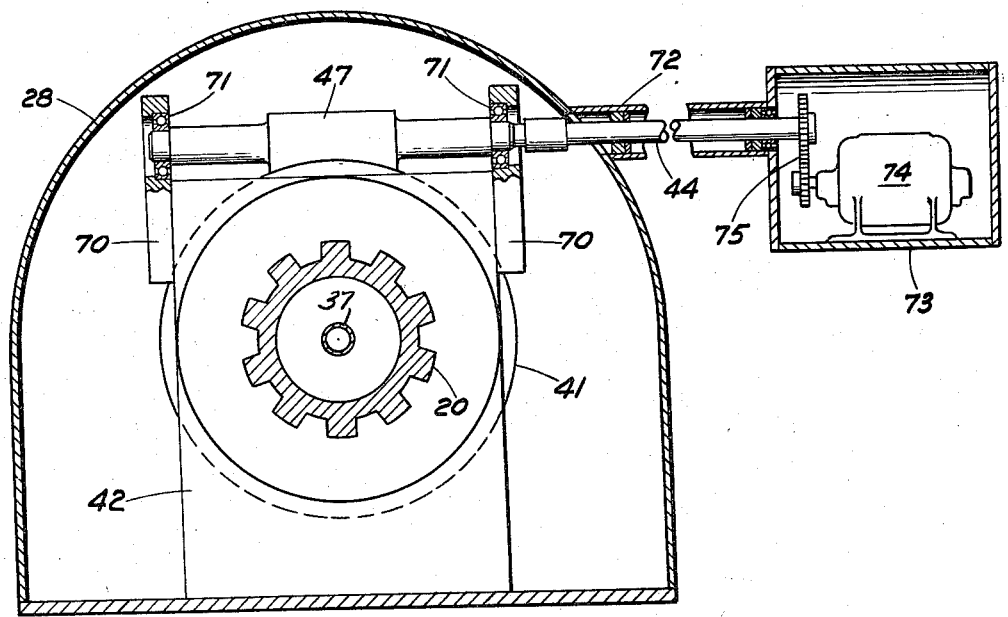

Numerous advantages and additional objects of the invention will become apparent from the following detailed description and annexed drawings, wherein Figure 1a is a partial sectional view of the forward or ejector end of the loading machine shown in its relation to the loading chamber of the reactor. Figure 1b is a sectional elevation of the rear or back part of the loading machine. Figure 2 is a sectional view of the loading chamber of the reactor showing an end view of the loading mechanism. Figure 3 is a plan view of the drive mechanism for the loading apparatus. Figure 4 is an enlarged section taken along line 4—4 of Figure 3. Figure 5 is an enlarged section taken along line 5—5 of Figure 1. Figure 6 is an enlarged detail view taken along line 6—6 of Figure 1.

Referring to Figure 1a, numeral 10 designates the extension of the pressure shell at the bottom of the nuclear reactor or pile, the pile being cylindrical and having vertical fuel channels. Manifold 11 is provided having a plurality of curved tubes as shown connecting the inlets to the fuel channels of the pile. The manifold itself forms a segment of a cylindrical surface. The fuel feeding machine of this invention is of a "muzzle loading type." The muzzle or discharge tube is indicated at 12 and as will be described, it is capable of movements such that the muzzle can be brought into registry with any of the openings in the manifold 11 and also with a fuel entrance port 14 disposed at an angle in the side of the shell extension 10.

Tube 12 has a right angle bend in it as may be seen on the drawing and it extends through a tapered fitting 16 which is rabbeted to an end plug 13 fitting in the end of an adjustable cylinder or sleeve 20. Extending downwardly from fitting 16 is a pilot pin 17 which may be used in connection with the indexing control mechanism for bringing tube 12 into registry with desired fuel channels. The cylinder 20 is within a tubular conduit or sleeve 23 communicating with the sidewall of the pressure shell 10, bearing 24 being provided between the cylinder 20 and the sleeve or tube 23 and a seal 25 also being provided between these members. Bearing 24 is a sleeve bearing providing for both rotation and axial movement of the sleeve 20. The tube 23 communicates with housing 27 having an enlarged portion 28, the housing enclosing the drive mechanism whereby rotational movement and sliding axial movement may be imparted to the cylinder 20. These mechanisms will be described presently. The horizontal portion of tube 12 is centrally disposed within cylinder 20, being spaced from the sidewalls thereof by spacer members 31. A flexible ram is provided within tube 12 as indicated by numeral 34, this ram being comprised of short rigid lengths connected by ball and socket joints so that the ram is axially rigid but laterally flexible so as to be able to traverse the right angle bend in tube 12. The ram includes a solid portion 37 which extends beyond the cylinder 20 into tubular housing 39, which is within housing 27 as shown in Figure 1b.

Also in Figure 1b it will be seen that numberal 41 designates a gear having a collar 40 which is splined onto the cylinder 20 and the collar portion 40 is mounted in a journal bearing 43 in a pedestal support 42 in the enlarged portion 28 of housing 27. Suitable thrust bearings 38 are provided between the gear 41 and pedestal 42 and between pedestal 42 and a bearing plate 45 attached to collar 40. The gear 41 is driven by a worm gear 47 mounted on a shaft 44 (see Figs. 3 and 4) and through this drive rotational movement may be imparted to cylinder 20 and consequently to the muzzle of tube 12, whereby it may move in an arc adjacent to the curved plate manifold 11. The shaft 44 is supported by bracket arms 70 extending from pedestal 42 (see Figs. 1a, 1b, 3 and 4) and is mounted in bearings 71 in these arms. Shaft 44 extends from housing 28 through shaft housing 72 to a motor cubicle 73 having therein a drive motor 74 and a suitable gear train 75 (see Fig. 4). Suitable seals are provided between shaft 44 and shaft housing 72.

The tubular housing 39 extends through an opening in the end of cylinder 20 at the center thereof and is attached to the cylinder 20 through a swivel connection formed by disc 50 disposed between bearings 76 forming thrust bearings within the end of the cylinder 20. By reason of the swivel connection the cylinder 20 may rotate relative to the tubular housing 39. On the top and bottom sides of the housing 39 are provided racks 51 and 52 which mesh with pinion gears 53 and 54, the lower one of which is an idler gear and the upper one of which is driven by a shaft 57 passing through a seal in the sidewall of the housing 27 as shown (see Fig. 5). The gears 53 and 54 are on shafts mounted in a pedestal 55 within housing 27, one being directly over the other as shown. Through the rack and pinion drive the housing 39 and consequently the cylinder 20 may be advanced or retracted within the tubular structure 23 so that the muzzle of tube 12 may be moved longitudinally, that is, parallel to the axis of the cylindrical surface of manifold 11. Thus by virtue of this movement of tube 12 combined with its angular movement the outlet of tube 12 may be brought into registry with any one of the openings in the plate of manifold 11.

The rigid portion 37 of the ram operating within tubular housing 39 is advanced and retracted by means of intermeshing helical gears 60 and 61, one of which engages the ram portion and the other of which, 60, is on a splined shaft 62. Thrust bearings 63 are provided on either side of the gear on shaft 62 to take up the axial thrust. Gears 60 and 61 are mounted in a gear box 64 which extends into housing 39, gear 61 having its axis vertical as may be seen on Fig. 1. When housing 39 is advanced or retracted gear box 64 moves with it, this being permitted by splined shaft 62. Shaft 62 is driven through bevel gears 67 and 69 and shaft 68. Shaft 68 is journalled in a bearing supported in an upstanding portion 79 of pedestal 55 (see Fig. 5). Bevel gear 69 is mounted on shaft 68 which extends from housing 27 through a suitable seal (see Fig. 5). Shaft 62 is similarly mounted in pedestal 55, and it carries gear 67. The right end of shaft 62 extends into bearing housing 80. Shaft 68, through gears 69 and 67 drives shaft 62 which through helical gears 60 and 61 drive the ram portion 37 which may be advanced or retracted as described.

From the foregoing it will be observed that by virtue of the three separate drives the tube 12 may be moved angularly, it may be advanced and retracted relative to sleeve 23 and the ram within the tube 12 may be advanced and retracted.

It will be understood, of course, that the motors providing the angular and reciprocatory drive for muzzle 12 will have appropriate power and speed and may have interlocking controls to facilitate indexing muzzle 12 to desired fuel channels.

In operation, as will be understood by those skilled in the art, muzzle 12 is operated or positioned to register with loading tube 14, with the rams 34—37 retracted. The muzzle or tube 12 is then loaded with fuel slugs or cartridges and then indexed to a desired fuel channel or channels as described above. By operation of the flexible ram one or more fuel slugs is forced up into the desired fuel channel.

As may be seen the loading mechanism may be indexed to any desired fuel channel at any particular location in the reactor. As pointed out above, a control mechanism may be provided whereby an operator may pick out any desired channel to be loaded and after making proper settings cause the drive motors to operate so as to index the loading to that desired channel. The control mechanism is not a part of my present invention.

As will be observed from the foregoing the drive for the flexible ram is carried in part by the advanceable and retractable housing 39, that is, gear box 64 moves with the housing 39 since the gear 60 is mounted on the splined shaft 62. Thus, the drive for the flexible ram does not conflict with the advancing and retraction of the loading tube itself.

While my invention as pointed out above has its principal adaptation in connection with the loading of chain reacting piles for reactors, it is of course conceivable that it might find adaptation in related types of apparatus wherein it is desired to effect similar material loading or handling operations. In other words the mechanism of my invention is effective to achieve the exact positioning of materials under control from a remote point particularly in the sense that the materials are to be positioned in any one of a plurality of particular positions. The invention combines flexibility and adaptability with simplicity and ruggedness of construction without introducing characteristics unfavorable to the fulfilling of sealing and shielding requirements.

I claim:

1. In a material loading or handling machine, in combination, means forming an advanceable and retractable ram, means forming a carriage for the ram, said carriage having mountings permitting advancing and retracting of the carriage, the ram having at its end a delivery tube turned at an angle to the direction of motion of the carriage, and mounting means providing for rotating the delivery end of the ram and delivery tube in an arcuate path whereby the delivery tube may be adjusted to a plurality of positions.

2. The structure of claim 1 including drive means for the ram, comprising a gear carried by the said carriage and means including a gear mounted on a splined drive shaft and being meshed with said first named gear for actuating said ram.

3. In a material loading or handling machine, in combination, means comprising a loading tube having a right angle delivery portion, a flexible ram disposed within the tube, drive means for the flexible ram, a carriage for reception of the loading tube and ram, means for actuating the carriage to bodily move the loading tube and ram to adjust the position of the delivery end of the tube, and additional means for moving the delivery end of the tube in an arcuate path without relative movement of the ram itself to provide for adjustment of the delivery end of the tube, said last named means including a gear carried by a portion of said carriage and driven from an external power source.

References Cited in the file of this patent

UNITED STATES PATENTS

| | | |
|---|---|---|
| 539,295 | Pierson | May 14, 1895 |
| 837,622 | James | Dec. 4, 1906 |
| 951,304 | Clark et al. | Mar. 8, 1910 |
| 980,181 | Asbury | Jan. 3, 1911 |
| 1,148,077 | Cowley | July 27, 1915 |
| 1,242,482 | Shotwell | Oct. 9, 1917 |
| 1,278,307 | Cressler | Sept. 10, 1918 |
| 1,753,036 | Williamson et al. | Apr. 1, 1930 |
| 2,215,736 | Jones | Sept. 24, 1940 |
| 2,365,158 | Wallick | Dec. 19, 1944 |
| 2,386,520 | Watson et al. | Oct. 9, 1945 |
| 2,388,092 | Shaub et al. | Oct. 30, 1945 |